United States Patent
Kohn

(10) Patent No.: US 6,578,548 B2
(45) Date of Patent: Jun. 17, 2003

(54) METHOD FOR CONTROLLING AN ENGINE IDLE SPEED

(75) Inventor: Min Kohn, Yongin (KR)

(73) Assignee: Hyundai Motor Company, Seoul (KR)

( * ) Notice: Subject to any disclaimer, the term of this patent is extended or adjusted under 35 U.S.C. 154(b) by 40 days.

(21) Appl. No.: 09/957,357

(22) Filed: Sep. 20, 2001

(65) Prior Publication Data

US 2002/0059916 A1 May 23, 2002

(30) Foreign Application Priority Data

Sep. 25, 2000 (KR) .......................................... 2000-56132

(51) Int. Cl.7 .............................................. F02D 41/08
(52) U.S. Cl. .............................. 123/339.18; 123/339.23
(58) Field of Search ......................... 123/339.18, 339.23

(56) References Cited

U.S. PATENT DOCUMENTS 5,111,788 A * 5/1992 Washino ................. 123/339.11
5,270,575 A * 12/1993 Togai et al. ............... 290/40 C
5,293,852 A * 3/1994 Lehner et al. ........... 123/339.18
5,712,786 A * 1/1998 Ueda ....................... 123/339.18

* cited by examiner

Primary Examiner—Erick Solis
(74) Attorney, Agent, or Firm—Christie, Parker & Hale, LLP

(57) ABSTRACT

The present invention provides a method for controlling idle speed of an engine in an engine idle control system including a battery voltage sensor, a coolant temperature sensor, a sensor for detecting an amount of alternator generation, an engine speed sensor, an ISC controlling an amount of air supplied to the engine in an idle state, and an ECU that is supplied with detected values from the sensors and outputs a control signal to the ISC based on the detected value being supplied, the method comprising the steps of:

(a) determining whether a time elapsed after starting is within a predetermined range; and (b) performing feedback control of engine speed in a state of stopping ISC control according to the amount of alternator generation when the time elapsed after starting is within the predetermined range.

9 Claims, 5 Drawing Sheets

METHOD FOR CONTROLLING AN ENGINE IDLE SPEED

CROSS-REFERENCE TO RELATED APPLICATION

This application claims priority of Korea patent Application No. 10-2000-0056132, filed on Sep. 25, 2000.

BACKGROUND OF THE INVENTION (a) Field of the Invention

The present invention relates to a method for controlling an engine idle speed, and more particularly, to a method for controlling an engine idle speed by stopping ECU generation control for a short time and performing a feedback control of an engine speed in an early state of running.

(b) Description of the Related Art

Generally, the ECU (Electronic Control Unit) is supplied with data by various sensors installed in the engine and it operates an actuator, and thereby controls the engine.

In particular, when the ECU controls an ISC (Idle Speed Controller) in an idle state, the ECU is supplied with data like battery voltage, coolant temperature, a generation signal of an alternator that generates electricity, and it calculates engine load from the above data. When an instantaneous amount of air of the ISC is not sufficient with respect to engine load, the ECU controls the amount of air through the ISC to prevent a fluctuation of the engine speed.

To control the ISC according to an alternator output voltage in the idle state is called the ECU generation control. The ECU generation control prevents the engine speed from dropping down because of an instantaneous shortage of the amount of the ISC air. When performing the ECU generation control, the normal feedback control of engine speed stops for a short time (for example, for 2 seconds).

As an example of the ISC control, when a changed amount of alternator generation is larger than a predetermined value, the coolant temperature is higher than a predetermined temperature, an engine speed is lower than a predetermined speed, and engine intake manifold pressure is lower than a predetermined pressure, a compensated amount of air is calculated and the ISC is controlled such that a compensated amount of air is supplied to the engine. At this time, the normal feedback control of the engine speed is stopped for a predetermined period.

However, the above method for controlling the idle speed of the engine is also applied in an early running step when an operation of the engine is not stable.

In an early running step of the engine, the amount of alternator generation changes dramatically according to battery voltage and degree of electrical load.

At this time, if the ECU generation control according to the prior art is executed, the feedback control of engine speed is stopped for a given period, so even though the engine speed changes dramatically, it cannot be adequately controlled to a desirable speed and it becomes unstable for the given period. More seriously, the engine can stall, and especially when a coolant temperature is above a predetermined temperature, engine speed in an idle state is low and thus a possibility of stalling is greater still.

SUMMARY OF THE INVENTION

Therefore, the present invention relates to a method to solve the above problems, and an object of the present invention is to provide a method for preventing ECU generation control in the early state of running and for performing feedback control of engine speed.

To achieve the above object, the present invention provides a method for controlling idle speed that is used in an engine idle control system including a coolant temperature sensor, an alternator generation amount sensor, an engine speed sensor, an ISC controlling an amount of air supplied to the engine in an idle state, and an ECU that is supplied with detected values from the sensors and outputs a control signal to the ISC based on the supplied values, the method comprising the steps of:

determining whether time elapsed after starting is within a predetermined range; and performing feedback control of engine speed in a state of stopping ISC control according to the amount of alternator generation when the time elapsed after starting is within the predetermined range.

DETAILED DESCRIPTION OF THE PREFERRED EMBODIMENTS

Hereinafter, an embodiment of the present invention will be described in detail with reference to the accompanying drawings.

Figure 1:
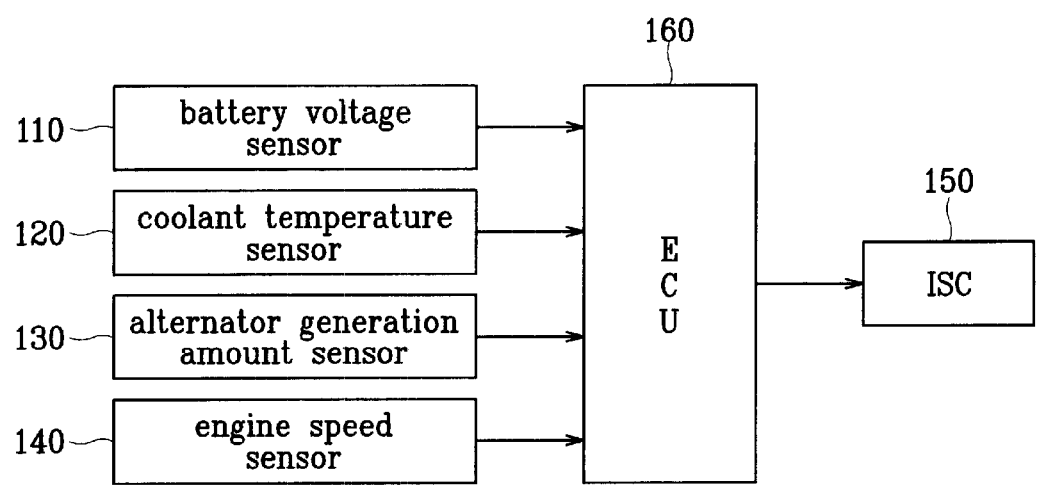
FIG. 1 is a block diagram showing a method for controlling idle speed of an engine according to an embodiment of the present invention.

FIG. 1 is a block diagram showing a method for controlling idle speed of an engine according to an embodiment of the present invention.

As shown in FIG. 1, an idle control system includes a battery voltage sensor 110, a coolant temperature sensor 120, an alternator generation amount sensor 130, an engine speed sensor 140, an ISC 150 for controlling air volume supplied to an engine in an idle state, and an ECU 160 which is supplied with detected values from the sensors and outputs a control signal to the ISC based on the detected values.

Figure 2:
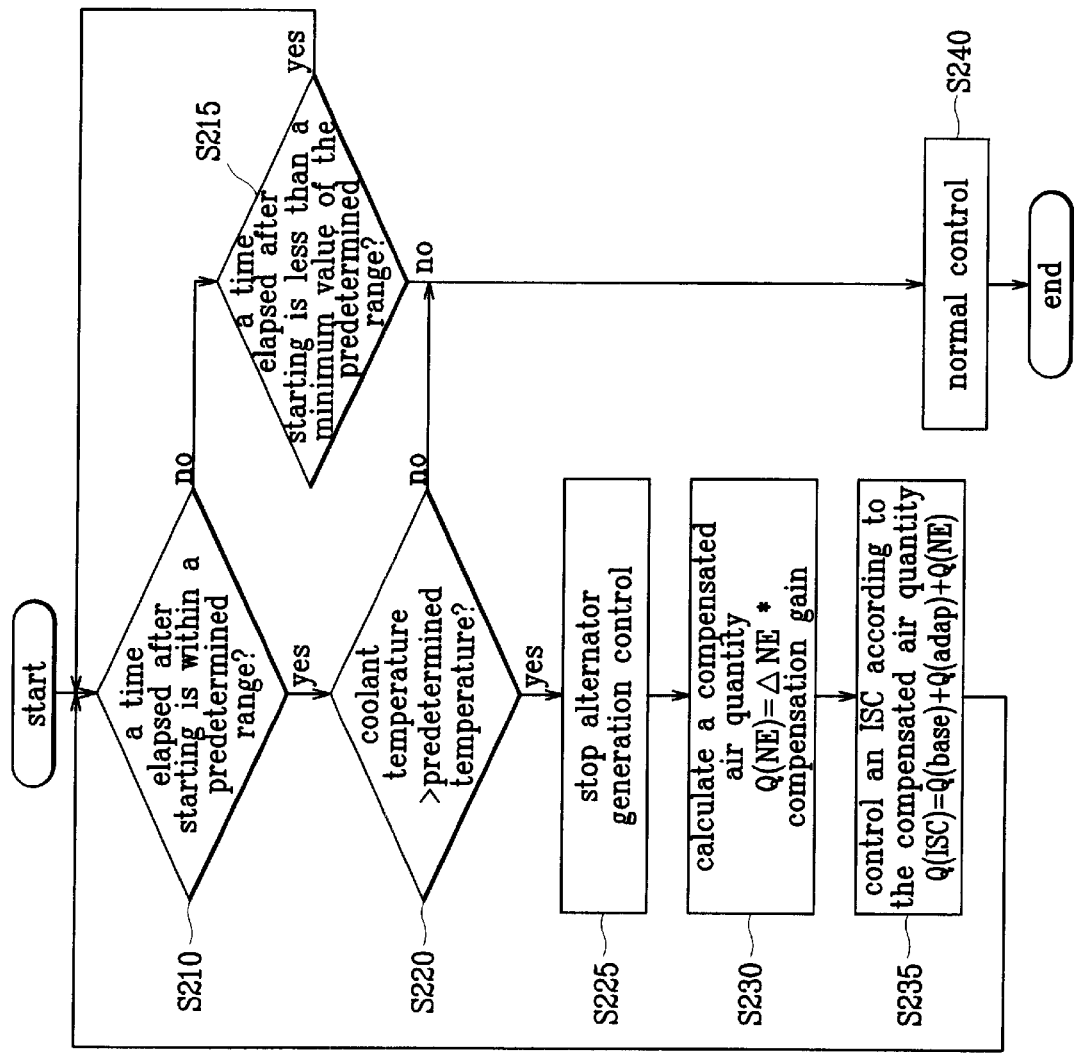
FIG. 2 is a flowchart showing a method for controlling idle speed of an engine according to an embodiment of the present invention.

FIG. 2 is a flowchart showing a method for controlling idle speed of an engine according to an embodiment of the present invention.

If the engine starts, a procedure of the method for controlling the idle speed of the engine according to an embodiment of the present invention starts.

First, the ECU 160 measures a time elapsed after starting and determines whether the elapsed time is within a predetermined range (S210).

Generally a starting step can be divided into a cranking step when power is supplied to a starter motor and it rotates, and an idle-entering step when, after the cranking step ends, an engine enters into a stable idle state. Therefore, it is preferable to set the idle-entering step as the predetermined range. Specifically, it is preferable that a minimum value of the predetermined range is set as a time when the cranking step ends and a maximum value of the predetermined range is set as a time when the engine starts to idle stably.

More particularly, the moment the cranking step ends is set as the moment the engine speed is greater than the engine speed when the starter motor is engaged, and the moment the engine starts to idle stably can be set as a general stable idle-entering time. By way of example, the predetermined range can be set to be from 3 to 10 seconds after starting is implemented.

When, in step S210, the elapsed time is not within the predetermined range, the procedure is advanced to step S215, where a determination is made as to whether the elapsed time is less than the minimum value of the predetermined range.

When the elapsed time is less than the minimum value of the predetermined range in step S215, the procedure is returned to step S210.

When the elapsed time is within the predetermined range in step S210, the procedure is advanced to step S220, where a determination is made as to whether the coolant temperature is higher than a predetermined temperature. The predetermined temperature can be set as an arbitrary temperature above which there is a high possibility that the engine speed fluctuates significantly in the early state of running.

When, in step S220, the coolant temperature is higher than the predetermined temperature, the procedure is advanced to step S225, where ECU generation control (namely, control according to alternator generation current amount) is prohibited.

After ECU generation control is prohibited, a compensated air quantity is calculated using a deviation of engine speed (S230).

The compensated air quantity can preferably be calculated by the following formula.

$$Q(NE)=\Delta NE * \text{compensation gain}$$

In the above formula, Q(NE) is the compensated air quantity, the $\Delta NE$ is a difference between a target engine speed and a real engine speed, and the compensation gain is a proportional constant to convert the difference between the two speeds into an amount of air.

After calculating the compensated air quantity, the procedure is advanced to step S235, where the ISC is controlled by the compensated air amount.

It is preferable to control the ISC by the amount of ISC air calculated by is the following formula.

$$Q(ISC)=Q(base)+Q(adap)+Q(NE)$$

In the above formula, Q(ISC) is a target amount of air that will be provided by the ISC, Q(base) is a basic amount of air according to the coolant temperature, and Q(adap) is an adapted amount of air.

After controlling the ISC as above described, the procedure is returned to step S210.

If the elapsed time is not less than the minimum value in step S215, or if the coolant temperature is lower than the predetermined temperature in step S220, the procedure is advanced to step S240 where the control of the idle speed of an engine in the early state of running ends and a normal control step is executed.

The normal control step S240 is executed by a general idle control method according to the prior art.

By way of example, first, a determination is made as to whether a normal control condition is satisfied. Then, in the case of the condition being satisfied, if the amount of alternator generation is greater than the predetermined amount, after stopping feedback control of engine speed and calculating a compensated air quantity by way of an ECU generation control, the ISC is controlled such that the compensated amount of air is provided to the engine.

An example of the normal control condition is that a changed amount of alternator generation is greater than a predetermined value, a coolant temperature is higher than a second predetermined value, engine speed is less than a predetermined speed, and an intake manifold pressure of an engine is less than a predetermined pressure.

The compensated air quantity by the ECU generation control can be acquired by multiplying the alternator generation amount by a compensation gain. The compensation gain is a proportional constant that converts the amount of generation into an amount of air.

Though a preferred embodiment of the present invention was explained in the above, those skilled in the art will appreciate that various modifications and substitutions can be made thereto without departing from the spirit and scope of the present invention as set forth in the appended claims.

Figure 3:
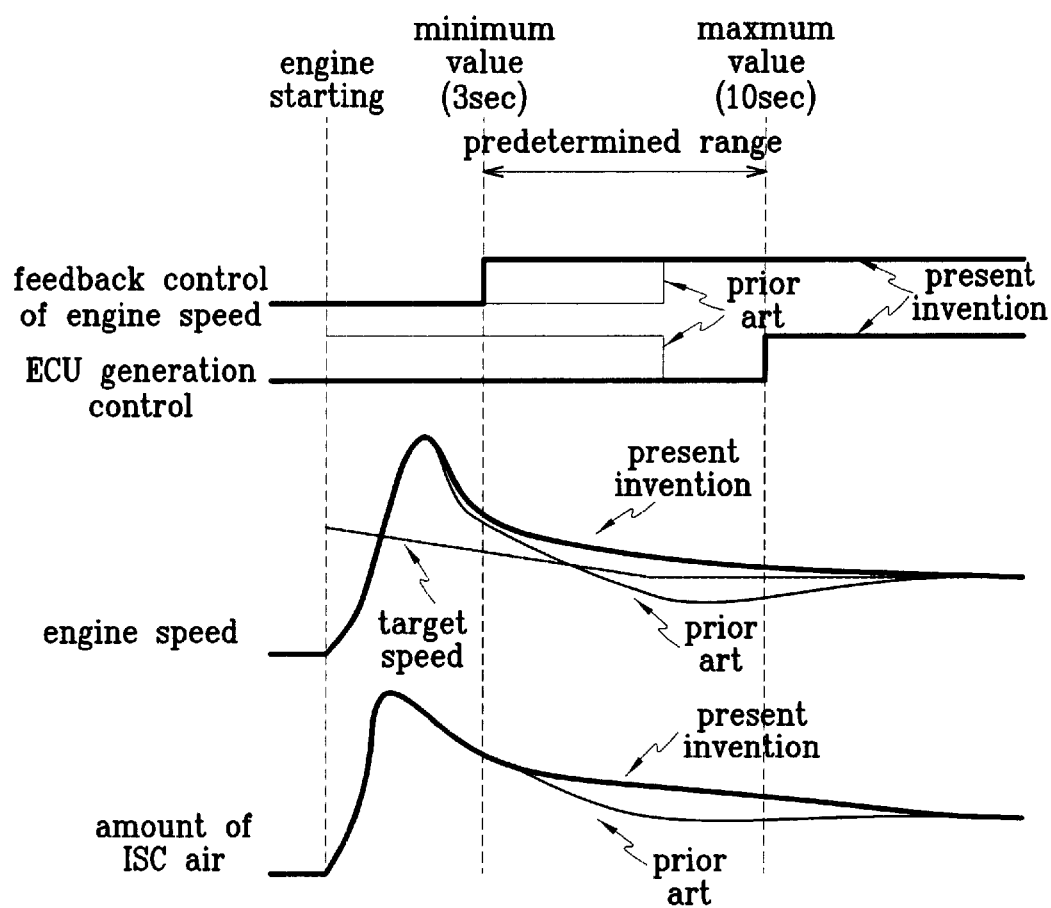
FIG. 3 is a graph showing a control process according to an embodiment of the present invention, and engine speed and amount of ISC air as a result of the method.

FIG. 3 is a graph showing a control process according to an embodiment of the present invention, and engine speed and amount of ISC air as a result of the method.

As shown in FIG. 3, feedback control of engine speed is executed for the predetermined range of from 3 to 10 seconds after engine starting is implemented.

Though the ECU generation control is executed for the period of the predetermined range in the prior art, the ECU generation control is prohibited for the period of the predetermined range in an embodiment of the present invention.

Consequently, in the prior art, the engine speed decreases to below a target speed and then increases, but in an embodiment of the present invention the engine speed is continuously maintained around the target value, and therefore the engine operates properly.

The curve representing the amount of air controlled by the ISC is analogous to the curve representing the engine speed.

Figure 4:
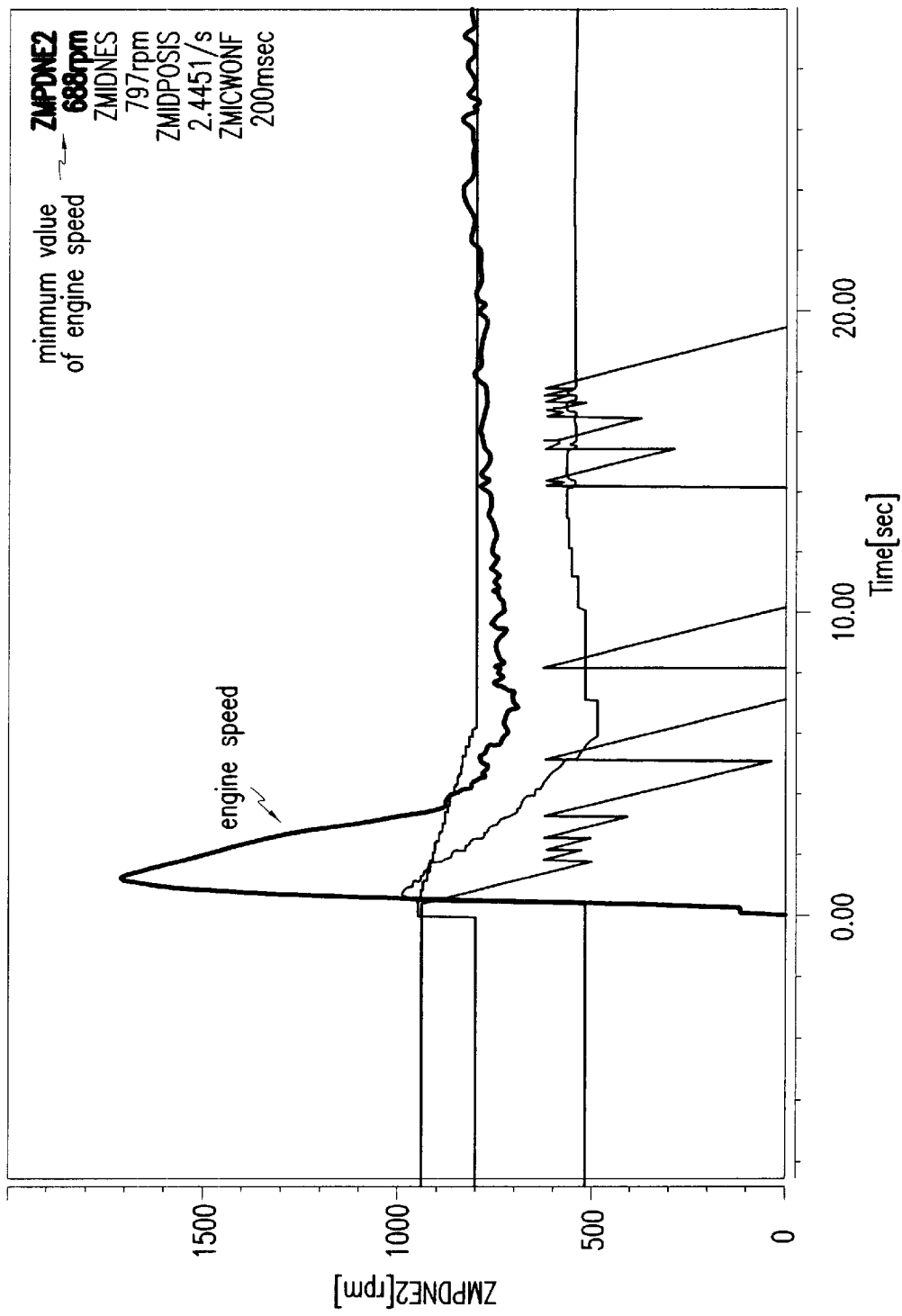
FIG. 4 and FIG. 5 are graphs respectively showing results of control by a prior art and by an embodiment of the present invention.
Figure 5:
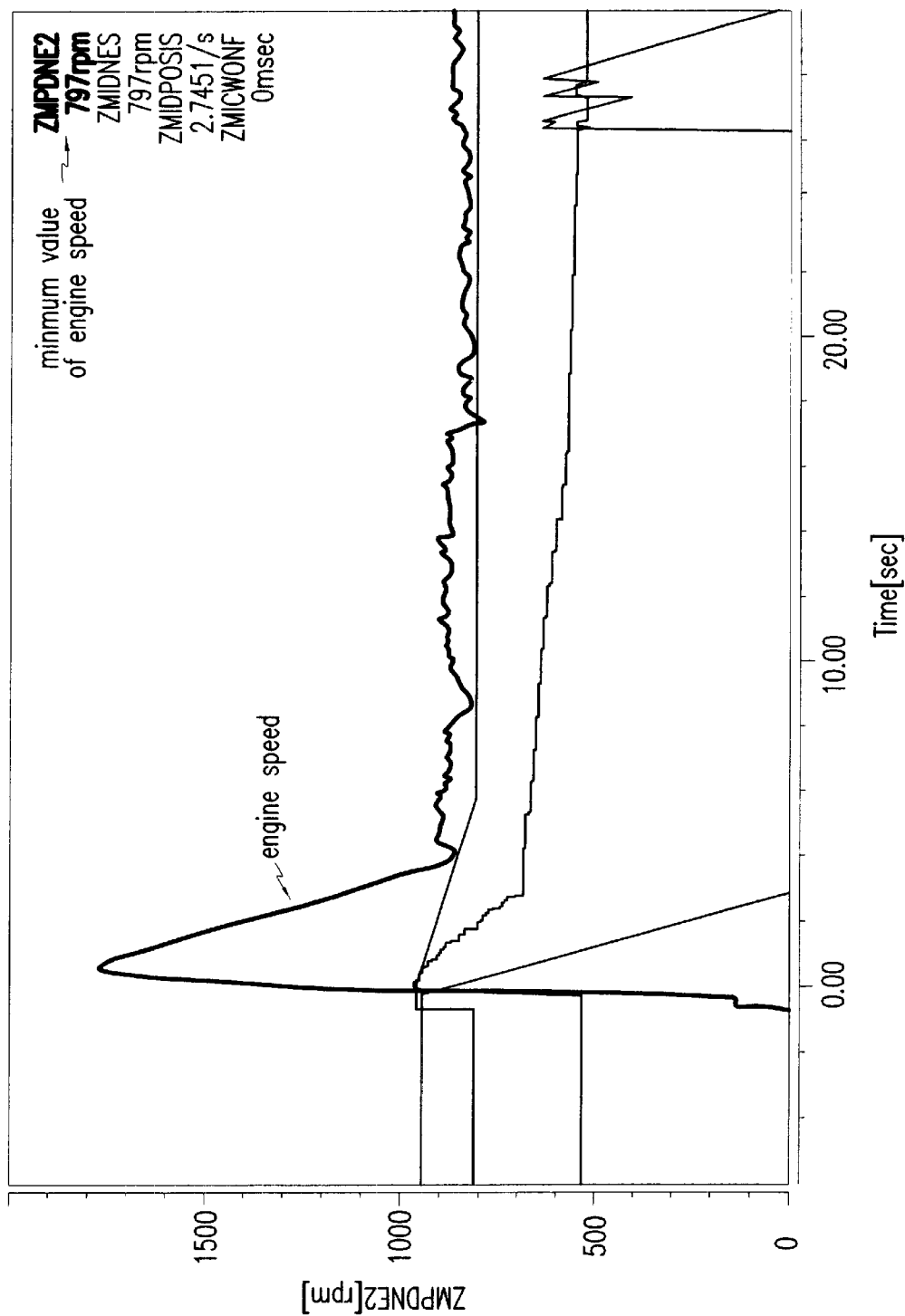

FIG. 4 and FIG. 5 are graphs respectively showing the results of control by a prior art and an embodiment of the present invention.

As shown in FIG. 4, engine speed rises temporarily in the early state of engine starting, and then before entering into the stable state, it falls under the target speed. Because, in the result of the test, engine speed drops to 688 rpm (revolutions per minute), if an engine load occurs, there is a possibility that the engine may stall.

However, as shown in FIG. 5, by the idle control method according to the embodiment of the present invention, the engine speed approaches the target speed and in an early state of engine running the engine speed is stable.

Results of experiments under several coolant temperatures are shown in the following table.

|  | Minimum engine speed (RPM) | |
| --- | --- | --- |
| Coolant temperature | Prior arte | Present invention |
| 83 | 703 | 797 |
| 87 | 688 | 797 |
| 92 | 758 | 797 |

As shown in the above, according to the embodiment of the present invention, instability of the engine speed at the early state of engine running can be prevented, and particularly, when the coolant temperature is high, instability of the engine speed can also be prevented.

What is claimed is:

1. A method for controlling engine idle speed wherein an ECU controls an ISC that controls an amount of air supplied to an engine in an idle state, the method comprising the steps of:
   (a) determining whether a time elapsed after starting is within a predetermined range; and
   (b) performing feedback control of engine speed in a state of stopping ISC control that is performed according to the amount of alternator generation when the time elapsed after starting is within the predetermined range.

2. The method of claim 1 wherein the predetermined range of step (a) is set between a maximum value and a minimum value, the minimum value being a time when cranking is completed, the maximum value being a time when the engine starts to idle stably.

3. The method of claim 1 wherein step (b) further comprises the steps of:
   (c) stopping ISC control that is performed according to the amount of alternator generation;
   (d) calculating a compensated air quantity; and
   (e) controlling the ISC based on the calculated compensated air quantity.

4. The method of claim 3 wherein in step (d) the compensated air quantity is calculated by multiplying a difference between a target engine speed and a real engine speed by a compensation gain.

5. The method of claim 3 wherein in the ISC control of step (e) a target amount of air is calculated by adding a basic amount of air and an adapted amount of air to the compensated air quantity.

6. The method of claim 1 wherein step (b) is executed when a coolant temperature is determined to be higher than a predetermined temperature.

7. The method of claim 2, wherein when the time elapsed after starting is not within the predetermined range in step (a), it is determined whether the time elapsed after starting is less than the minimum value, and when the time elapsed after starting is less than the minimum value, a procedure is returned to the step of determining whether the time elapsed after starting is within the predetermined range.

8. The method of claim 6, wherein when the coolant temperature is not higher than the predetermined temperature, it is determined whether a normal control condition is satisfied, the normal control condition being that a change of an amount of alternator generation is greater than a predetermined value, an engine speed is not higher than a predetermined engine speed, and an intake manifold pressure of the engine is not higher than a predetermined value, and in the case the normal control condition is satisfied, if the amount of alternator generation is greater than the predetermined value, after stopping a feedback control of engine speed for a given period and calculating a compensated air quantity, the ISC is controlled such that the compensated air quantity is provided to the engine.

9. The method of claim 7, wherein when the elapsed time is not less than the minimum value, it is determined whether a normal control condition is satisfied, the normal control condition being that a change of an amount of alternator generation is greater than a predetermined value, an engine speed is not higher than a predetermined engine speed, and an intake manifold pressure of the engine is not higher than a predetermined value, and in the case the normal control condition is satisfied, if the amount of alternator generation is greater than the predetermined value, after stopping a feedback control of engine speed for a given period and calculating a compensated air quantity, the ISC is controlled such that the compensated air quantity is provided to the engine.

* * * * *